US008430058B2

(12) United States Patent
Sakakibara et al.

(10) Patent No.: US 8,430,058 B2

(45) Date of Patent: Apr. 30, 2013

(54) ELECTROSTATIC COATING APPARATUS WITH INSULATION ENLARGING PORTIONS

(75) Inventors: Masahito Sakakibara, Okazaki (JP); Hisanori Nakamura, Toyota (JP); Youichi Hanai, Obu (JP); Hideki Saito, Toyota (JP); Michio Mitsui, Yokohama (JP); Toshio Hosoda, Yokohama (JP); Kiyoto Kobayashi, Azumino (JP); Takeshi Ichikawa, Azumino (JP); Yoshinori Aida, Azumino (JP)

(73) Assignees: Toyota Jidosha Kabushiki Kaisha, Toyota-shi (JP); Ransburg Industrial Finishing K.K., Yokohama-shi (JP); Harmonic Drive Systems Inc., Shinagawa-ku (JP)

( * ) Notice: Subject to any disclaimer, the term of this patent is extended or adjusted under 35 U.S.C. 154(b) by 463 days.

(21) Appl. No.: 12/672,790

(22) PCT Filed: Aug. 7, 2008

(86) PCT No.: PCT/JP2008/064188

§ 371 (c)(1), (2), (4) Date: Feb. 9, 2010

(87) PCT Pub. No.: WO2009/022618

PCT Pub. Date: Feb. 19, 2009

(65) Prior Publication Data

US 2012/0031329 A1 Feb. 9, 2012

(30) Foreign Application Priority Data

Aug. 10, 2007 (JP) ................................ 2007-209580

(51) Int. Cl.

| | |
|---|---|
| ***B05C 5/02*** | (2006.01) |
| ***B05B 5/025*** | (2006.01) |
| ***B05B 5/00*** | (2006.01) |
| ***F23D 11/32*** | (2006.01) |
| *B01J 19/08* | (2006.01) |
| *H01F 41/00* | (2006.01) |
| *B05D 1/40* | (2006.01) |
| *B05B 5/04* | (2006.01) |
| *G21H 1/00* | (2006.01) |

(52) U.S. Cl.

USPC ........... 118/626; 118/621; 118/620; 239/703; 239/706; 427/457; 427/480; 427/484

(58) Field of Classification Search .................. 118/626, 118/621; 427/457, 480, 484; 239/703, 706

See application file for complete search history.

(56) References Cited

U.S. PATENT DOCUMENTS

| | | | | |
|---|---|---|---|---|
| 4,020,866 | A * | 5/1977 | Wiggins ........................ | 137/592 |
| 4,042,991 | A * | 8/1977 | Macy et al. .................... | 14/77.1 |

(Continued)

FOREIGN PATENT DOCUMENTS

| | | | |
|---|---|---|---|
| JP | 8-1047 | A | 1/1996 |
| JP | 8-173856 | A | 7/1996 |

(Continued)

*Primary Examiner* — Dah-Wei Yuan

*Assistant Examiner* — Karl Kurple

(74) *Attorney, Agent, or Firm* — Kenyon & Kenyon LLP

(57) ABSTRACT

Provided is an electrostatic coating apparatus capable of insulating an electric motor electrically from a member, to which an electrostatic high voltage is applied, and reducing the size and weight of the electrostatic coating apparatus. This electrostatic coating apparatus comprises a rotary atomizing head, to which high voltage is electrostatically applied, an electrostatically grounded AC servomotor, and a spindle and a fixed insulating member for insulating the AC servomotor electrically from the rotary atomizing head and a speed-increasing device to be set at the same potential as that of the former. The spindle and the fixed insulating member have insulation distance enlarging portions and of the mode, in which the creepage insulation distances from the speed-increasing device to the AC servomotor are enlarged.

3 Claims, 5 Drawing Sheets

U.S. PATENT DOCUMENTS

| | | | | |
|---|---|---|---|---|
| 4,887,770 | A * | 12/1989 | Wacker et al. | 239/703 |
| 5,346,139 | A * | 9/1994 | Davis et al. | 239/703 |
| 5,749,529 | A * | 5/1998 | Kazama et al. | 239/690 |
| 5,788,164 | A * | 8/1998 | Tomita et al. | 239/700 |
| 6,230,994 | B1 * | 5/2001 | Boerner et al. | 239/700 |
| 6,422,491 | B1 * | 7/2002 | Bilz et al. | 239/691 |
| 6,581,857 | B2 * | 6/2003 | Fujii et al. | 239/703 |
| 6,630,025 | B2 * | 10/2003 | Nonomura et al. | 118/300 |
| 6,722,591 | B2 * | 4/2004 | Reichler | 239/700 |
| RE38,526 | E * | 6/2004 | Hansinger et al. | 239/3 |
| 6,945,483 | B2 * | 9/2005 | Clifford et al. | 239/690.1 |
| 7,757,630 | B2 * | 7/2010 | Yoshida et al. | 118/621 |
| 2003/0169951 | A1 * | 9/2003 | Nishijima et al. | 384/103 |
| 2006/0124782 | A1 * | 6/2006 | Matsumoto et al. | 239/706 |
| 2007/0260474 | A1 * | 11/2007 | Arlton et al. | 705/1 |
| 2008/0069967 | A1 * | 3/2008 | Lind | 427/484 |
| 2008/0149026 | A1 * | 6/2008 | Cedoz et al. | 118/308 |
| 2009/0202731 | A1 * | 8/2009 | Kazkaz et al. | 118/300 |
| 2010/0145516 | A1 * | 6/2010 | Cedoz et al. | 700/258 |
| 2010/0147215 | A1 * | 6/2010 | Baumann et al. | 118/621 |
| 2010/0209616 | A1 * | 8/2010 | Murata et al. | 118/688 |
| 2011/0052829 | A1 * | 3/2011 | Brendel | 427/458 |

FOREIGN PATENT DOCUMENTS

| | | | |
|---|---|---|---|
| JP | 2000-117155 | A | 4/2000 |
| JP | 2001-137745 | A | 5/2001 |
| JP | 2007-98382 | A | 4/2007 |

* cited by examiner

ELECTROSTATIC COATING APPARATUS WITH INSULATION ENLARGING PORTIONS

This is a 371 national phase application of PCT/JP2008/063840 filed 1 Aug. 2008, claiming priority to Japanese Patent Application No. JP 2007-206427 filed 8 Aug. 2007, the contents of which are incorporated herein by reference.

FIELD OF THE INVENTION

The present invention relates to an electrostatic coating apparatus for electrostatically coating an object to be coated and more particularly to an electrostatic coating apparatus provided with a rotary atomizing head that rotates to atomize a coating material.

BACKGROUND OF THE INVENTION

There has heretofore been known an electrostatic coating apparatus including a rotary atomizing head that rotates to atomize a coating material and configured to electrostatically coat an object to be coated such as a vehicle body. Such apparatus is arranged to drivingly rotate the rotary atomizing head applied with electrostatic high voltage, atomizing a fluid coating material supplied to this rotary atomizing head into fine particles by centrifugal force while electrically charging the fine coating particles with the electrostatic high voltage applied to the rotary atomizing head, thus ejecting out the particles. In general, electrostatic coating is performed in such a manner of setting an object to be coated to a positive electrode and an electrostatic coating apparatus to a negative electrode, thereby forming an electrostatic field therebetween, and attracting an atomized coating material negatively charged to the object by electrostatic force.

The above electrostatic coating apparatus is disclosed in for example Patent Literature 1. The electrostatic coating apparatus of Patent Literature 1 employs an electric motor as a driving source for driving the rotary atomizing head to rotate. The use of the electric motor can provide improved control response related to rise time and fall time, thus controlling the number of revolutions of the rotary atomizing head to a desired number in a short time (e.g., in about 0.5 seconds). Accordingly, coating can be performed more efficiently than the case using an air motor. The motor can attain a stable number of revolutions, leading to improved coating quality.

Citation List

Patent Literature

Patent Literature 1: JP2007-98382 A

SUMMARY OF INVENTION

Technical Problem

The rotary atomizing head is applied with electrostatic high voltage. Thus, when this high voltage is also applied to the electric motor, the high voltage is also applied to a power supply circuit of the electric motor, imposing a burden on the power supply circuit. Therefore, it is preferable to electrically insulate the electric motor from the rotary atomizing head and a high-voltage member having the same potential as the former.

However, the voltage applied to the rotary atomizing head and others is an extremely high voltage. To reliably insulate the electric motor from the rotary atomizing head and others, therefore, an insulation distance between the rotary atomizing head and others and the electric motor, in particular, a creepage insulation distance has to be sufficiently long. As a result, the electrostatic coating apparatus is apt to be increased in size just by the long insulation distance. The electrostatic coating apparatus is sometimes mounted for example in a robot for use and thus size reduction and weight reduction are demanded.

The present invention has been made in view of the circumstances and has a purpose to provide an electrostatic coating apparatus capable of electrically insulating an electric motor from a member to which an electrostatic high voltage is applied and reducing the size and weight of the electrostatic coating apparatus.

Solution to Problem

A solution is an electrostatic coating apparatus of a rotary atomizing type for electrostatically coating an object to be coated, comprising: a rotary atomizing head that rotates to atomize a coating material and that is applied electrostatically with high voltage; an electric motor that drives the rotary atomizing head to rotate and that is electrostatically grounded; a spindle made of an electrically insulating material for electrically insulating the electric motor from the rotary atomizing head and a speed increasing device mechanically connected to the rotary atomizing head and having the same potential as the rotary atomizing head, the spindle being inserted through the electric motor and mechanically connected to the speed increasing device, and the spindle including one or more insulation distance enlarging portions configured to increase a creepage insulation distance from the rotary atomizing head or the speed increasing device to the electric motor; and one or more fixed insulating members fixedly placed between the speed increasing device and the electric motor for electrically insulating the electric motor from the rotary atomizing head and the speed increasing device, the fixed insulating members including one or more insulation distance enlarging portions configured to increase a creepage insulation distance from the rotary atomizing head or the speed increasing device to the electric motor, the spindle includes, as the insulation distance enlarging portion, a zigzag portion having a zigzag form to increase the creepage insulation distance, and the fixed insulating member including, as the insulation distance enlarging portion, a zigzag portion having a zigzag form to increase the creepage insulation distance.

The electrostatic coating apparatus of the invention includes the spindle and the fixed insulating member for electrically insulating the electric motor from the rotary atomizing head and the speed increasing device. Thus, electrostatic high voltage applied to the rotary atomizing head and the speed increasing device is not applied to a power supply circuit through the electric motor and thus no burden is imposed on the power supply circuit.

In addition, each of the spindle and the fixed insulating member has the insulation distance enlarging portion configured to increase the creepage insulation distance. The creepage insulation distance from the rotary atomizing head or the speed increasing device to the electric motor can be made sufficiently long. Accordingly, the rotary atomizing head or the speed increasing device and the electric motor can be placed at a short distance in the electrostatic coating apparatus. Providing the sufficient creepage insulation distance by the insulation distance enlarging portion formed in each of the spindle and the fixed insulating member can also achieve size reduction and weight reduction of the spindle and the insulating member. This makes it possible to reliably electrically insulate the electric motor from the member to which electrostatic high voltage is applied and also to reduce the size and weight of the electrostatic coating apparatus.

Each term "spindle" and "fixed insulating member" includes the "insulation distance enlarging portion" configured to enlarge the creepage insulation distance. The "insulation distance enlarging portion" may include for example, as mentioned later, a zigzag portion formed in a zigzag shape to increase the creepage insulation distance, an extended portion formed in an extending shape to increase the creepage insulation distance, or the like.

(Deleted)

Furthermore, the electrostatic coating apparatus of the invention includes, as the insulation distance enlarging portion of the spindle, the zigzag portion having a zigzag form to increase the creepage insulation distance from the rotary atomizing head or the speed increasing device to the electric motor. In addition, the apparatus includes, as the insulation distance enlarging portion of the fixed insulating member, the zigzag portion having a zigzag form to increase the creepage insulation distance from the rotary atomizing head or the speed increasing device to the electric motor. The presence of such zigzag portion can easily provide the long creepage insulation distance. Accordingly, the electric motor can be reliably insulated from the rotary atomizing head or the speed increasing device.

Furthermore, in the above electrostatic coating apparatus, preferably, the spindle includes, as the insulation distance enlarging portion, an extended portion to increase the creepage insulation distance, and the fixed insulating member includes the insulation distance enlarging portion, an extended portion to increase the creepage insulation distance.

The electrostatic coating apparatus of the invention includes, as the insulation distance enlarging portion of the spindle, the extended portion having an extended form to increase the creepage insulation distance between the rotary atomizing head or the speed increasing device to the electric motor. In addition, the apparatus includes, as the insulation distance enlarging portion of the fixed insulating member, the extended portion having an extended form to increase the creepage insulation distance between the rotary atomizing head or the speed increasing device to the electric motor. The presence of such extended portion can easily provide the long creepage insulation distance. The electric motor can be reliably insulated from the rotary atomizing head or the speed increasing device.

REFERENCE SIGNS LIST

Figure 1:
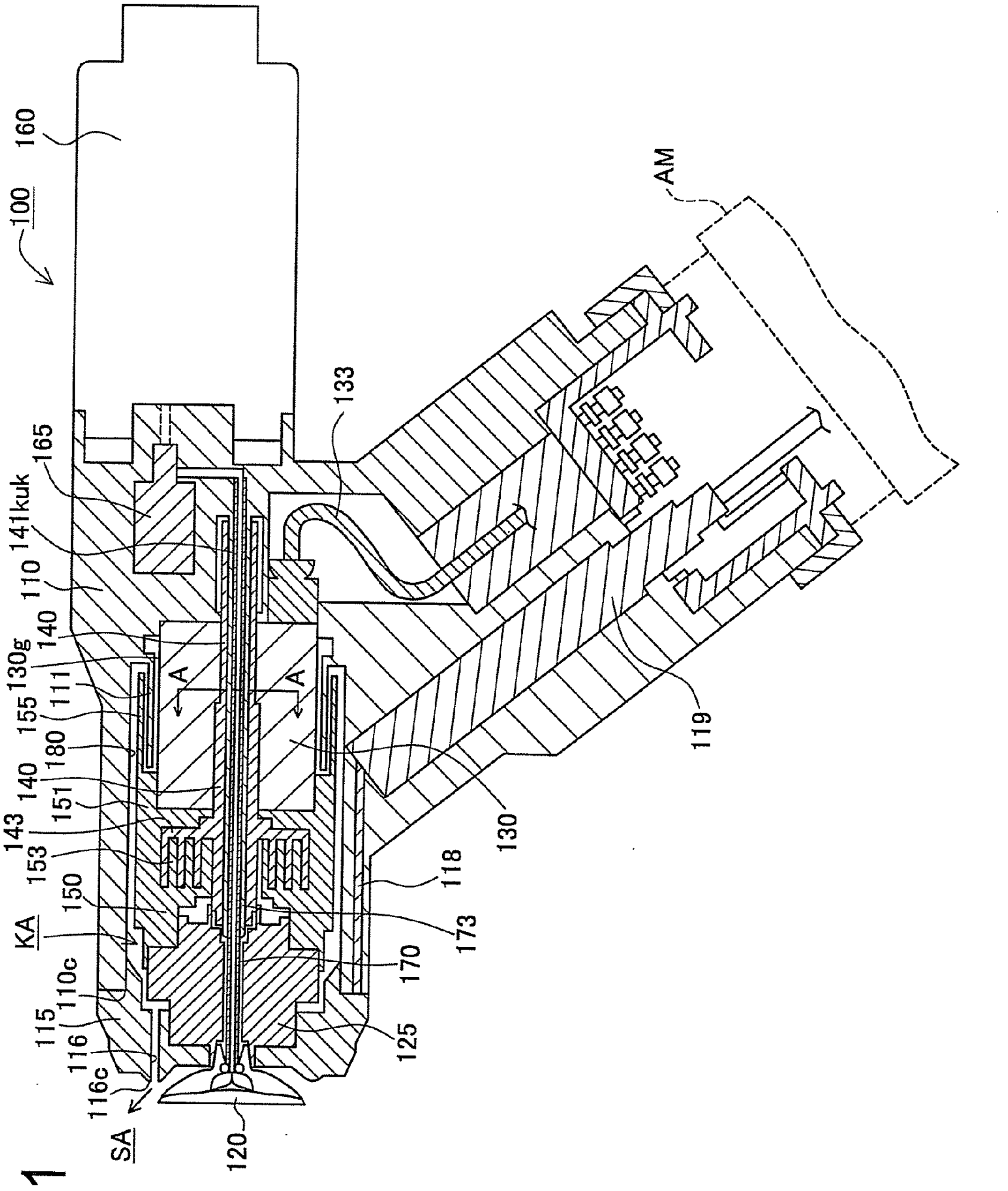
FIG. 1 is a cross-sectional side view of an electrostatic coating apparatus in an embodiment.

100 Electrostatic coating apparatus
110 Housing
116*c* Air ejecting port
116 Air ejecting section
120 Rotary atomizing head
125 Speed increasing device (High-voltage member)
130 AC servomotor (Electric motor)
130*g* Outer peripheral surface
140 Spindle (First insulating member)
141 Cylindrical portion
141*kuk* Rear-end-side portion (of a rear-end-side thin portion) (First extended part) (Insulation distance enlarging portion)
143 First zigzag portion (Insulation distance enlarging portion)
150 Fixed insulating member (Second insulating member)
151 Main body
153 Second zigzag portion (Insulation distance enlarging portion)
155 Second extended portion (Insulation distance enlarging portion)
160 Coating cartridge
165 Coating valve
170 Coating supply pipe
180 Air path
KA Cooling air
SA Shaping air

DETAILED DESCRIPTION

Figure 2:
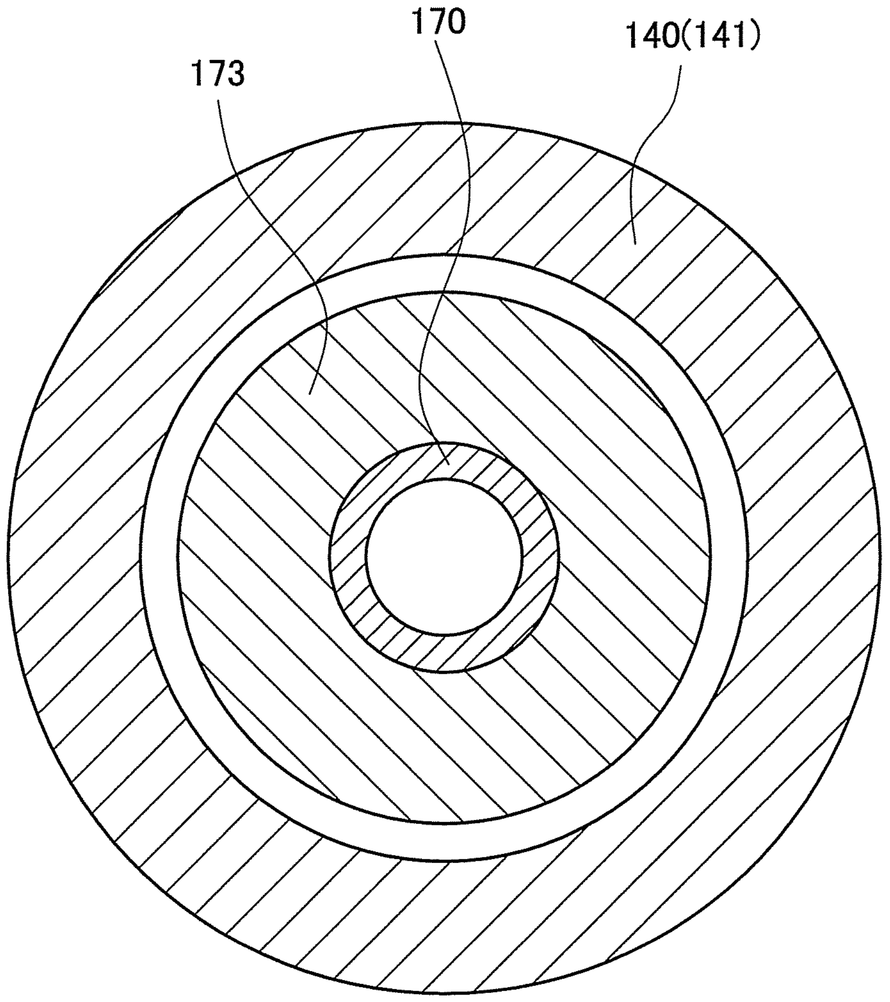
FIG. 2 is a cross-sectional view of part of the apparatus taken along a line A-A in FIG. 1.
Figure 3:
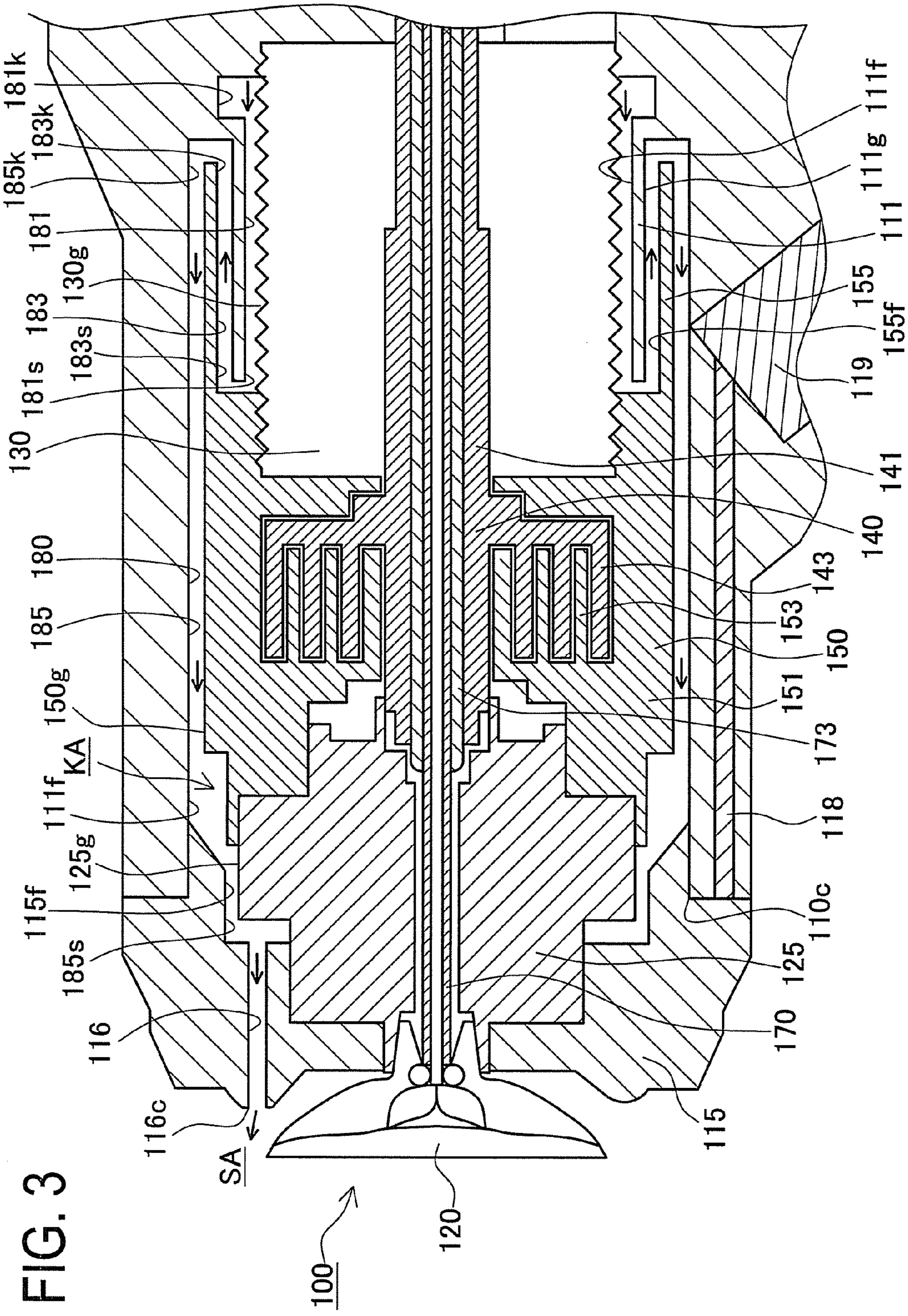
FIG. 3 is a partial enlarged cross-sectional view showing a front-end-side part of the apparatus in FIG. 1.
Figure 4:
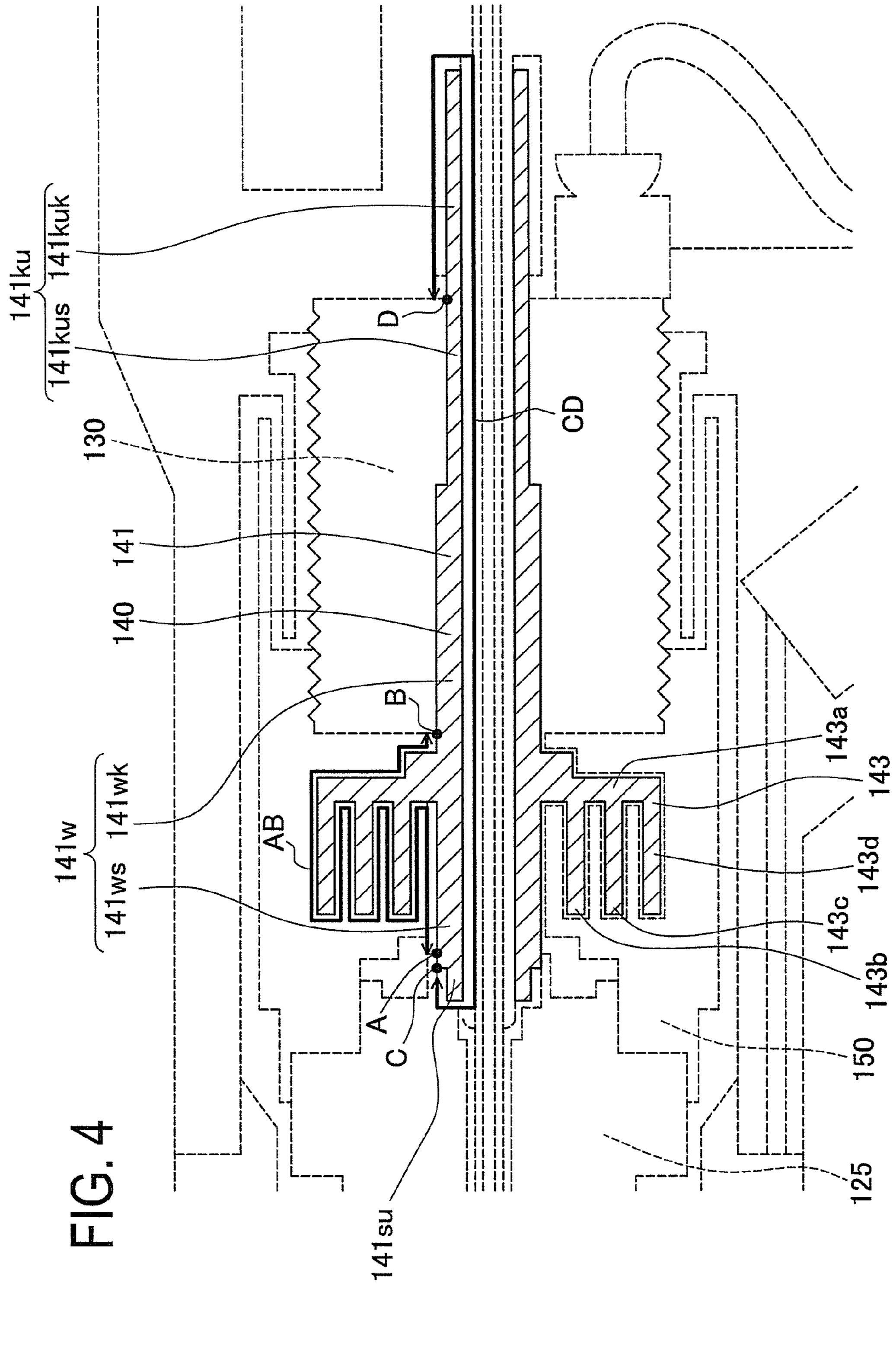
FIG. 4 is an explanatory view showing a spindle in the apparatus.
Figure 5:
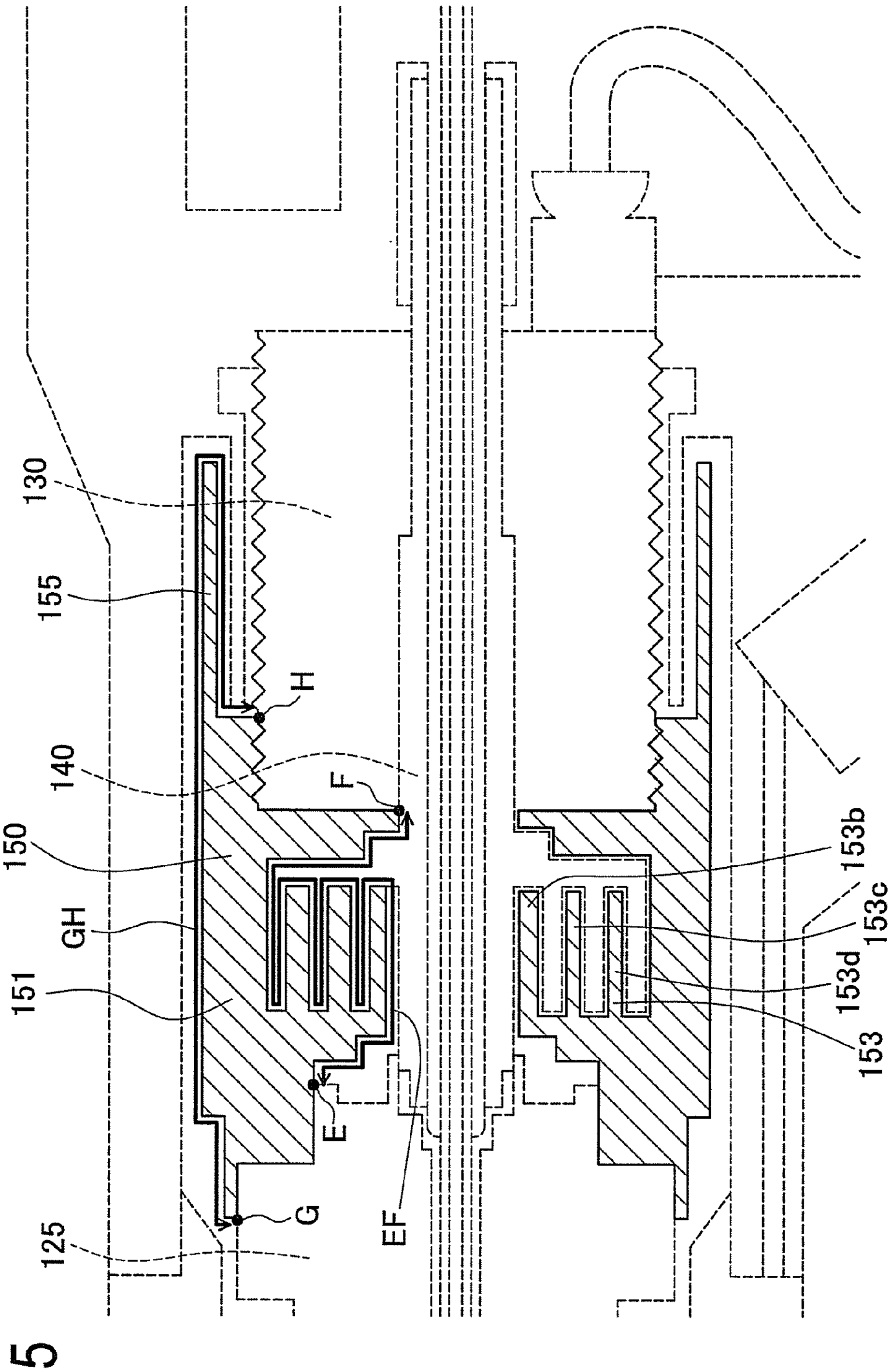
FIG. 5 is an explanatory view showing a fixed insulating member in the apparatus.

A detailed description of a preferred embodiment of the present invention will now be given referring to the accompanying drawings. FIG. 1 shows an electrostatic coating apparatus 100 in this embodiment. FIG. 2 is a cross sectional view of the apparatus 100 taken along a line A-A in FIG. 1. FIG. 3 shows a front-end-side part of this electrostatic coating apparatus 100 in an enlarged view. FIG. 4 shows a spindle (a first insulating member) 140 of the electrostatic coating apparatus 100. FIG. 5 shows a fixed insulating member (a second insulating member) 150.

This electrostatic coating apparatus 100 is mounted on an arm AM of a robot indicated by a broken line in FIG. 1 to perform electrostatic coating on a vehicle body (not shown) which is an object to be coated. In FIGS. 1, 3 to 5, the left side in each drawing is assumed as a front end side, the right side is assumed as a rear end side, the upper side is assumed as an upper side, and the lower side is assumed as a lower side.

This electrostatic coating apparatus 100 includes a housing 110, a rotary atomizing head 120 placed closer to the front end side than the housing 110, and a speed increasing device (a high-voltage member) 125 mechanically connected to the rotary atomizing head 120 as shown in FIG. 1. The electrostatic coating apparatus 100 further includes an AC servomotor (an electric motor) serving as a driving source of the rotary atomizing head 120, and the spindle 140 placed through this AC servomotor 130 and mechanically connected to the speed increasing device 125. The electrostatic coating apparatus 100 further includes a fixed insulating member 150 fixedly placed between the speed increasing device 125 and the AC servomotor 130, a coating cartridge 160 filled with a coating material, and a coating valve 165.

The housing 110 is made of insulating resin and has an opening 110*c* on the front end side in which a front end member 115 made of metal is fixedly mounted to close the opening 110*c*. This front end member 115 is provided with an air ejecting section 116 formed therethrough for communication between the outside and inside of the member 115. This air ejecting portion 116 includes an air ejecting port 116*c* through which shaping air SA is ejected out (leftward in FIG. 1). A rear end of this air ejecting portion 116 is communicated with an air path 180 mentioned later. Accordingly, when compressed air (in this embodiment, cooling air KA mentioned later) is supplied to the air ejecting portion 116 via the air path 180, the whole amount of the compressed air (the cooling air KA) is ejected out as the whole amount of the shaping air SA through the air ejecting port 116*c*.

This front end member 115 is electrically connected to a high voltage cascade (a high-voltage generator) 119 placed on the lower side in the housing 110 through a high-voltage cable 118 arranged in the housing 110. This high-voltage cascade 119 is operated to generate electrostatic high voltage and apply it to the front end member 115. In use, therefore, the front end member 115 has a potential of about −90 kV.

The rotary atomizing head 120 made of metal is rotatably attached to the front end side of the front end member 115. On the other hand, the speed increasing device 125 is placed on the rear end side of the front end member 115 and mechanically connected to the rotary atomizing head 120.

The rotary atomizing head 120 is mechanically connected to the speed increasing device 125 as mentioned above. The speed increasing device 125 is mechanically connected at its rear end to the spindle 140 inserted through the AC servomotor 130 mentioned later. The rotary atomizing head 120 is therefore driven to rotate by rotation driving force of AC servomotor 130 through the speed increasing device 125 and the spindle 140.

Furthermore, the front end member 115 is applied with electrostatic high voltage by the high-voltage cascade 119 as mentioned above. Since the speed increasing device 125 fixedly attached to the front end member 115 and the rotary atomizing head 120 connected to the speed increasing device 125 are made of metal, the speed increasing device 125 and the rotary atomizing head 120 are similarly applied with electrostatic high voltage and they have a potential of about −90 kV.

The rotary atomizing head 120 is further connected at its radial center to a coating supply pipe 170 made of a SUS tube (see FIG. 2 in addition to FIGS. 1 and 3). The rotary atomizing head 120 is rotated at high speed (about 30000 revolutions per minute in this embodiment) by the AC servomotor 130 and the speed increasing device 125, thereby atomizing the fluid coating material supplied to the rotary atomizing head 120 through the coating supply pipe 170, by centrifugal force into fine particles, thus ejecting out the atomized coating material. At that time, the rotary atomizing head 120 is applied with electrostatic high voltage and the coating material supplied to the rotary atomizing head 120 is negatively charged. Accordingly, the vehicle body to be coated is relatively set at positive voltage (concretely, ground voltage) and subjected to coating. An electrostatic field is thus formed between the rotary atomizing head 120 and the vehicle body, so that the negatively charged atomized coating material can be efficiently coated on the vehicle body.

The speed increasing device 125 has a publicly known configuration. Specifically, this speed increasing device 125 has a two-stage speed increasing mechanism including a front-stage planetary gear mechanism and a rear-stage planetary gear mechanism both not shown. An input shaft of the front-stage planetary gear mechanism is mechanically connected to the spindle 140 mentioned later. On the other hand, an output shaft of the rear-stage planetary gear mechanism is mechanically connected to the rotary atomizing head 120. Thus, the rotation driving force of the AC servomotor 130 is increased in speed in two stages by the front-stage planetary gear mechanism and the rear-stage planetary gear mechanism of the speed increasing device 125 and then is transmitted to the rotary atomizing head 120. The speed of the speed increasing device 125 in this embodiment is multiplied six times. Therefore, the number of revolutions of the AC servomotor 130 is set to 5000 rpm, the number of revolutions of the rotary atomizing head 120 can reach 30000 rpm required for atomization of the coating material.

The AC servomotor 130 is placed in a predetermined position in the housing 110 on the rear end side than the speed increasing device 125. This AC servomotor 130 includes an outer peripheral surface 130*g* in a zigzag form having protrusions and recesses each extending circumferentially and arranged alternately in an axial direction (see FIG. 3). This outer peripheral surface 130*g* therefore has a larger surface area as compared with the case having no protrusions and recesses. In FIG. 1, for convenience of illustration, the protrusions and recesses are not shown. This AC servomotor 130 is electrically connected to a power supply circuit not shown through a power supply cable 133 and others. The AC servomotor 130 is driven to rotate by the electric power supplied from the power supply circuit. The AC servomotor 130 is connected to the outside through the power supply cable 133 and others and electrostatically grounded.

In the AC servomotor 130, the spindle 140 is placed through a radial center thereof. This spindle 140 is integrally made of insulating resin. This spindle 140 has a cylindrical portion 141 extending in a cylindrical form from the front end side to the rear end side as additionally shown in FIG. 4. This cylindrical portion 141 includes a rear-end-side thin portion 141*ku* having a thin wall located on the rear end side than the axial center of the cylindrical portion 141, a thick portion 141*w* having a thick wall located on the front end side than the axial center, and a front-end-side thin portion 141*su* having a thin wall located on the front end side than the thick portion 141*w*.

Of the rear-end-side thin portion 141*ku*, a front-end-side portion 141*kus* located on the front end side than the center of the thin portion 141*ku* is placed through the AC servomotor 130. On the other hand, a rear-end-side portion (a first extended portion (an insulation distance enlarging portion)) 141*kuk* located on the rear end side than the center of the thin portion 141*ku* extends from the AC servomotor 130 toward the rear end side. Of the thick portion 141*w*, a rear-end-side portion 141*wk* located on the rear end side than the center of the thick portion 141*w* is placed in the AC servomotor 130. On the other hand, a front-end-side portion 141*ws* located on the front end side than the center of the thick portion 141*w* extends from the AC servomotor 130 toward the front end side. A front end portion of the thick portion 141*w* is mechanically connected to the speed increasing device 125.

Radially inside the cylindrical portion 141, a cylindrical resin pipe 173 made of insulating resin is placed with a gap from the cylindrical portion 141 (see FIGS. 1 to 3). This resin pipe 173 covers the coating supply pipe 170 for supplying a coating material to the rotary atomizing head 120 with no gap therebetween. Together with the cylindrical portion 141 of the spindle 140, the resin pipe 173 is to electrically insulate the AC servomotor 130 from electrostatic high voltage. In other words, the front end member 115 is applied with electrostatic high voltage by the high-voltage cascade 119 and the speed increasing device 125 and the rotary atomizing head 120 are also applied with electrostatic high voltage, as mentioned above, so that the rotary atomizing head 120 is similarly applied with electrostatic high voltage. Accordingly, the coating supply pipe 170 made of metal and placed through the inside of the AC servomotor 130 is also applied with electrostatic high voltage from the coating material and hence has a potential of about −90 kV. To electrically insulate the AC servomotor 130 from the coating supply pipe 170 applied with high voltage, consequently, the resin pipe 173 and the resin spindle 140 (the cylindrical portion 141) are arranged between the coating supply pipe 170 and the AC servomotor 130.

Of the cylindrical portion 141 of the spindle 140, on the radially outer side of the front-end-side portion 141*ws* of the thick portion 141*w*, a first zigzag portion (an insulation distance enlarging portion) 143 having a zigzag comb-shaped cross section is provided as shown in FIG. 4. This first zigzag portion 143 has a disk portion 143*a* radially outwardly extending in a disk shape from the front-end-side portion 141*ws* of the thick portion 141*w*. The first zigzag portion 143 further has a 1-1 cylindrical portion 143*b* extending from a predetermined position on the radially inner side of the disk portion 143*a* toward the front end side and externally surrounding the front-end-side portion 141*ws* of the thick portion 141*w* in concentric fashion. The first zigzag portion 143 also has a 1-2 cylindrical portion 143*c* extending from a predetermined position of the disk portion 143*a* and externally surrounding the 1-1 cylindrical portion 143*b* in concentric fashion. Furthermore, the first zigzag portion 143 has a 1-3 cylindrical portion 143*d* extending from a predetermined position on the radially outer side of the disk portion 143*a* toward the front end side and externally surrounding the 1-2 cylindrical portion 143*c* in concentric fashion.

In this embodiment, as above, the spindle 140 includes the first zigzag portion 143 and thus the creepage insulation distance is sufficient long between the speed increasing device 125 to which the electrostatic high voltage is applied and the AC servomotor 130. To be more concrete, a creepage insulation distance AB between a point A located on the rear end side of the speed increasing device 125 and a point B located on the front end side of the AC servomotor 130 is considerably long because of the presence of the first zigzag portion 143. Accordingly, creeping discharge from the speed increasing device 125 to the AC servomotor 130 can be prevented reliably and thus the AC servomotor 130 can be insulated reliably from the speed increasing device 125. In this embodiment, the rotary atomizing head 120 is placed apart on the further front end side relative to the speed increasing device 125 and therefore the AC servomotor 130 is also reliably insulated from the rotary atomizing head 120.

Since the spindle 140 includes the rear-end-side portion (the first extended portion) 141*kuk* of the rear-end-side thin portion 141*ku*, the creepage insulation distance from the speed increasing device 125 to which electrostatic high voltage is applied to the AC servomotor 130 is sufficiently long. To be specific, a creepage insulation distance CD from a point C located on the rear end side of the speed increasing device 125 to a point D located on the rear end side of the AC servomotor 130, passing the inside of the AC servomotor 130, is considerably long because of the presence of the rear-end-side portion 141*kuk*. Accordingly, creeping discharge from the speed increasing device 125 to the AC servomotor 130 can be reliably prevented and thus the AC servomotor 130 can be surely insulated from the speed increasing device 125.

The fixed insulating member 150 is placed between the AC servomotor 130 and the speed increasing device 125. This fixed insulating member 150 is integrally made of insulating resin. This fixed insulating member 150 has a substantially cylindrical main body 151 most of which is located between the AC servomotor 130 and the speed increasing device 125. The main body 151 contacts with the speed increasing device 125 on the front end side and contacts with the AC servomotor 130 on the rear end side.

A second zigzag portion (an insulation distance enlarging portion) 153 having a zigzag comb-shaped cross section is provided on the radially inner side of the main body 151. This second zigzag portion 153 has a 2-1 cylindrical portion 153*b* extending from a predetermined position of the main body 151 toward the rear end side and surrounding the front-end-side portion 141*ws* of the thick portion 141*w* of the spindle 140 in concentric fashion. The second zigzag portion 153 also has a 2-2 cylindrical portion 153*c* extending from a predetermined position of the main body 151 and surrounding the 2-1 cylindrical portion 153*b* in concentric fashion. Furthermore, the second zigzag portion 153 has a 2-3 cylindrical portion 153*d* extending from a predetermined position of the main body 151 and surrounding the 2-2 cylindrical portion 153*c* in concentric fashion.

The 2-1 cylindrical portion 153*b* of the second zigzag portion 153 is located on the radially outer side of the thick portion 141*w* of the spindle 140 and on the radially inner side of the 1-1 cylindrical portion 143*b* of the first zigzag portion 143 of the spindle 140 (see FIG. 4 as well as FIG. 5). The 2-2 cylindrical portion 153*c* of the second zigzag portion 153 is located on the radially outer side of the 1-1 cylindrical portion 143*b* of the first zigzag portion 143 and on the radially inner side of the 1-2 cylindrical portion 143*c* of the first zigzag portion 143. The 2-3 cylindrical portion 153*d* of the second zigzag portion 153 is located on the radially outer side of the 1-2 cylindrical portion 143*c* of the first zigzag portion 143 and on the radially inner side of the 1-3 cylindrical portion 143*d* of the first zigzag portion 143.

The main body 151 is formed at its rear end with a second extended portion (an insulation distance enlarging portion) 155 having a cylindrical shape extending from the main body 151 toward the rear end side. This second extended portion 155 is located on the radially outer side of the outer peripheral surface 130*g* of the AC servomotor 130.

In this embodiment, the fixed insulating member 150 includes the second zigzag portion 153 and thus the creepage insulation distance is sufficient long between the speed increasing device 125 to which the electrostatic high voltage is applied and the AC servomotor 130. To be more concrete, a creepage insulation distance EF between a point E located on the rear end side of the speed increasing device 125 and a point F located on the front end side of the AC servomotor 130 is considerably long because of the presence of the second zigzag portion 153. Accordingly, the AC servomotor 130 can be reliably insulated from the speed increasing device 125. In this embodiment, the rotary atomizing head 120 is placed on the further front end side relative to the speed increasing device 125 and therefore the AC servomotor 130 is also reliably insulated from the rotary atomizing head 120.

Since the fixed insulating member 150 includes the second extended portion 155, the creepage insulation distance between the speed increasing device 125 to which electrostatic high voltage is applied and the AC servomotor 130 is sufficiently long. To be specific, a creepage insulation distance GH from a point G of the speed increasing device 125 to a point H of the AC servomotor 130 is considerably long because of the presence of the second extended portion 155. Accordingly, the AC servomotor 130 can be reliably insulated from the speed increasing device 125.

Next, the air path 180 through which the cooling air KA passes will be explained (see FIGS. 1 and 3). This air path 180 includes a first path section 181 extending from the vicinity of the rear end of the outer peripheral surface 130*g* of the AC servomotor 130 toward the front end side along the outer peripheral surface 130*g*. In the housing 110, this first path section 181 is defined by an inner peripheral surface 111*f* of a housing cylindrical portion 111 surrounding the outer peripheral surface 130*g* of the AC servomotor 130. In the first path section 181, the outer peripheral surface 130*g* of the AC servomotor 130 is exposed.

A rear end 181*k* of this first path section 181 is communicated to the outside of the electrostatic coating apparatus 100 through a path section not shown and connected to a pressure air source not shown placed outside. Accordingly, when the cooling air (compressed air) KA is supplied from the pressure air source to the air path 180, the cooling air KA flows through the first path section 181 from its rear end 181*k* toward a front end 181*s*. In this first path section 181, the outer peripheral surface 130*g* of the AC servomotor 130 having a jagged surface, providing a large surface area, is exposed. Accordingly, the AC servomotor 130 is more efficiently cooled by the cooling air KA.

The air path 180 includes a second path section 183 continuous to the front end 181*s* of the first path section 181 and extending along the first path section 181 on the radially outer side thereof toward the rear end side. This second path section 183 is defined by the outer peripheral surface 111*g* of the housing cylindrical portion 111 of the housing 110 and an inner peripheral surface 115*f* of the second extended portion 155 of the fixed insulating member 150. The cooling air KA flowing through the first path section 181 while cooling the AC servomotor 130 then flows through the second path section 183 from its front end 183*s* to rear end 183*k*.

Furthermore, the air path 180 has a third path section 185 located on the radially outer side than the second path section 183 and having one end continuous to the rear end 183*k* of the second path section 183 and the other end continuous to the air ejecting section 116. This third path section 185 is defined by the inner peripheral surface 111*f* of the housing 110 and the outer peripheral surface 150*g* of the fixed insulating member 150 and also by the inner surface 115*f* of the front end member 115 and the outer peripheral surface 125*g* of the speed increasing device 125. The cooling air KA having flowing through the second path section 183 then flows through the third path section 185 from its rear end 185*k* to front end 185*s*. The cooling air KA is thus supplied to the air ejecting section 116. Subsequently, the whole amount of this cooling air KA is ejected as the whole amount of the shaping air SA to the outside through the air ejecting port 116*c*.

The electrostatic coating apparatus 100 further includes the coating cartridge 160 made of resin as shown in FIG. 1. This coating cartridge 160 is mounted in the housing 110 on the rear end side. This coating cartridge 160 is filled with a water-based coating material to be used for coating. A front end of this coating cartridge 160 is connected to a coating valve 165 made of metal and placed on the rear end side than the AC servomotor 130 in the housing 110. This coating valve 165 draws up the coating material from the coating cartridge 160 to supply the coating material to the rotary atomizing head 120 through the coating supply pipe 170.

The front end member 115, the speed increasing device 125, and the rotary atomizing head 120 are applied with electrostatic high voltage by the high-voltage cascade 119 as mentioned above. Thus, the coating material supplied to the rotary atomizing head 120 is also applied with the electrostatic high voltage. This coating material is supplied to the rotary atomizing head 120 through the coating cartridge 160, the coating valve 165, and the coating supply pipe 170 as mentioned above. Accordingly, when the electrostatic high voltage is applied to the coating material, the electrostatic high voltage is also applied to the coating valve 165 and the coating supply pipe 170 both made of metal. Thus, each of the valve 165 and the pipe 170 has a potential of about −90 kV. However, since part of the housing 110 made of insulating resin is present between the coating valve 165 and the AC servomotor 130, the AC servomotor 130 is also reliably electrically insulated from the coating valve 165 to which the electrostatic high voltage is applied.

As explained above, the electrostatic coating apparatus 100 in this embodiment includes the spindle 140 and the fixed insulating member 150 whereby the AC servomotor 130 is electrically insulated from the rotary atomizing head 120 and the speed increasing device 125. Accordingly, the electrostatic high voltage applied to the rotary atomizing head 120 and the speed increasing device 125 is not applied to the power supply circuit of the AC servomotor 130 therethrough. No burden is therefore imposed on the electric circuit.

In addition, the spindle 140 includes the first zigzag portion 143 and the rear-end-side portion (the first extended portion) 141*kuk* of the rear-end-side thin portion 141*ku* as the insulation distance enlarging portion. This makes it possible to provide the long creepage insulation distances AB and CD between the speed increasing device 125 and the AC servomotor 130. Accordingly, the speed increasing device 125 and the AC servomotor 130 can be placed at a short distance in the electrostatic coating apparatus 100. The spindle 140 also can have a reduced size particularly in its axial direction, achieving the weight reduction. The electrostatic coating apparatus 100 can therefore be reduced in size and weight while providing reliable electric insulation of the AC servomotor 130 from the speed increasing device 125 to which the electrostatic high voltage is applied.

The fixed insulating member 150 includes the second zigzag portion 153 and the second extended portion 155 as the insulation distance enlarging portion. This makes it possible to provide the long creepage insulation distances EF and GH between the speed increasing device 125 and the AC servomotor 130. Accordingly, the speed increasing device 125 and the AC servomotor 130 can be placed at a short distance in the electrostatic coating apparatus 100. The fixed insulating member 150 also can have a reduced size particularly in its axial direction, achieving the weight reduction. The electrostatic coating apparatus 100 can therefore be reduced in size and weight while providing reliable electric insulation of the AC servomotor 130 from the speed increasing device 125 to which the electrostatic high voltage is applied.

In the present embodiment, the spindle 140 and the fixed insulating member 150 have the first zigzag portion 143, the rear-end-side portion (the first extended portion) 141*kuk*, the second zigzag portion 153, and the second extended portion 155 as the insulation distance enlarging portion. This makes it possible to easily provide the long creepage insulation distances AB, CD, EF, and GH, thereby reliably insulating the AC servomotor 130 from the speed increasing device 125. Furthermore, the present embodiment includes the speed increasing device 125 and therefore the number of revolutions of the AC servomotor 130 can be reduced just by the speed increased by the speed increasing device 125. To be concrete, the number of revolutions of the AC servomotor 130 can be reduced to 5000 revolutions per minute corresponding to one-sixth of the number of revolutions of the rotary atomizing head 120. Therefore, even though the spindle 140 is made of insulating resin lower in rigidity than metal and others, the spindle 140 is unlikely to be broken by the centrifugal force or the like.

The present invention is explained along the above embodiment but is not limited thereto. The present invention may be embodied in other specific forms without departing from the essential characteristics thereof.

The invention claimed is:

1. An electrostatic coating apparatus for electrostatically coating an object to be coated, comprising:

a rotary atomizing head that rotates to atomize a coating material and that is applied electrostatically with voltage to electrify the coating material at least at a minimum potential necessary for electrostatic coating;

an electric motor that drives the rotary atomizing head to rotate and that is electrostatically grounded;

a spindle made of an electrically insulating material for electrically insulating the electric motor from the rotary atomizing head;

a speed increasing device mechanically connected to the rotary atomizing head and having the same potential as the rotary atomizing head, the spindle being inserted through the electric motor and mechanically connected to the speed increasing device, and the spindle including a zigzag portion having a zigzag form to increase a creepage insulation distance from the rotary atomizing head or the speed increasing device to the electric motor; and one or more fixed insulating members fixedly placed between the speed increasing device and the electric motor for electrically insulating the electric motor from the rotary atomizing head and the speed increasing device, the fixed insulating members including a zigzag portion having a zigzag form to increase a creepage insulation distance from the rotary atomizing head or the speed increasing device to the electric motor;

wherein the zigzag portion of the spindle is complementary to and fits within the zigzag portion of the fixed insulating member; and wherein the zigzag portion of the spindle is further formed rotationally symmetric with respect to the spindle in order for an interface between the zigzag portion of the spindle and the zigzag portion of the one or more fixed insulating members; and the zigzag portion of the spindle is configured to rotate with respect to the zigzag portion of the one or more fixed insulating members.

2. The electrostatic coating apparatus according to claim 1, wherein the spindle further includes an extended portion to increase the creepage insulation distance, and the fixed insulating member further includes an extended portion to increase the creepage insulation distance.

3. The electrostatic coating apparatus according to claim 1, wherein the spindle further includes an extended portion that extends behind the rear end of the electric motor.

* * * * *

UNITED STATES PATENT AND TRADEMARK OFFICE
CERTIFICATE OF CORRECTION

PATENT NO. : 8,430,058 B2
APPLICATION NO. : 12/672790
DATED : April 30, 2013
INVENTOR(S) : Sakakibara et al.

It is certified that error appears in the above-identified patent and that said Letters Patent is hereby corrected as shown below:

In the Claims, at column 11, claim 1, line 15:
Delete “atomizing head, the spindle” and insert therefor --atomizing head, and the spindle--.

Signed and Sealed this
Twentieth Day of August, 2013

Teresa Stanek Rea
*Acting Director of the United States Patent and Trademark Office*